United States Patent [19]
Miller

[11] Patent Number: 4,917,730
[45] Date of Patent: Apr. 17, 1990

[54] PREVENTION OF SPOTTING IN THERMAL IMAGING COMPOSITIONS

[75] Inventor: Alan G. Miller, Woodbury, Minn.

[73] Assignee: Minnesota Mining and Manufacturing Company, St. Paul, Minn.

[21] Appl. No.: 788,162

[22] Filed: Oct. 16, 1985

Related U.S. Application Data

[63] Continuation-in-part of Ser. No. 600,474, Apr. 16, 1984.

[51] Int. Cl.[4] ............................................ C09D 11/00

[52] U.S. Cl. ...................................... 106/21; 427/150; 427/151; 503/216; 503/217; 503/219; 503/225; 503/226

[58] Field of Search .................. 106/21; 346/216, 217, 346/219, 225, 226; 427/150, 151; 503/216, 217, 219, 225, 226

[56] References Cited

U.S. PATENT DOCUMENTS

| | | | |
|---|---|---|---|
| 3,865,593 | 2/1975 | Yoshida | 430/222 |
| 3,986,880 | 10/1976 | Wainer et al. | 96/90 |
| 4,066,459 | 1/1978 | Bachman et al. | 96/45.2 |
| 4,247,618 | 1/1981 | Dessauer et al. | 430/342 |
| 4,291,102 | 9/1981 | Tsukahara | 106/21 |
| 4,348,234 | 9/1982 | Cespon | 106/21 |
| 4,379,835 | 4/1983 | Lowrey et al. | 430/338 |
| 4,422,671 | 12/1983 | Cespon | 106/21 |
| 4,423,139 | 12/1983 | Isbrandt et al. | 430/338 |
| 4,460,677 | 7/1984 | Smith et al. | 430/336 |

FOREIGN PATENT DOCUMENTS

| | | |
|---|---|---|
| 52-23806 | 6/1977 | Japan . |
| 52-25330 | 7/1977 | Japan . |
| WO81/01755 | 6/1981 | PCT Int'l Appl. . |

OTHER PUBLICATIONS

Chemical Abstracts, 132168p, vol. 82, 1975.

*Primary Examiner*—Amelia Burgess Yarbrough
*Attorney, Agent, or Firm*—Donald M. Sell; Walter N. Kirn; David L. Weinstein

[57] ABSTRACT

Thermally imageable composition comprising (a) at least one leuco dye, (b) a nitrate salt, (c) at least one base having a conjugate acid having pKa equal to or greater than zero. The base serves to prevent spotting or backgrounding of transparency films bearing said thermally imageable composition during the manufacturing process used in preparing the films.

13 Claims, No Drawings

PREVENTION OF SPOTTING IN THERMAL IMAGING COMPOSITIONS

This application is a continuation-in-part of U.S. Ser. No. 600,474, filed Apr. 16, 1984.

BACKGROUND OF THE INVENTION

This invention relates to thermally imageable compositions and to stabilizers for these compositions.

It is well known that dyes in their reduced leuco form can provide the basis of color image forming systems. The leuco dyes may initially be relatively colorless, but can return to a colored form when oxidized, e.g., by air under acidic conditions or any other suitable oxidizing agent. Examples of leuco dyes used in color image forming systems include triarylmethanes, xanthenes, styryl dyes, and azine dyes, such as, for example, phenoxazines, phenothiazines, and phenazines.

In thermally sensitive materials of the type wherein at least one leuco dye is in reactive proximity with an inorganic nitrate salt, whereby imagewise application of heat causes said nitrate salt to oxidize said leuco dye to produce a change in color, a problem may arise from premature spotting or backgrounding of the thermally sensitive material during the drying step of the manufacturing process.

As used herein, the term "spotting" means oxidation of the leuco dye to a colored dye form in random irregular spots; the term "backgrounding" means oxidation of the leuco dye to a colored dye form in uniform fashion, resulting in an evenly colored background. Either spotting or backgrounding can destroy the usefulness of a transparency film bearing a thermally imageable composition. One method for preventing spotting involves drying of the imageable coating at low temperatures. This method, however, requires long drying times, slow coating speeds, and high costs, and in most cases, does not offer a practical solution to the problem.

In thermally imageable transparency films based upon combinations of leuco dyes and nitrate salts, it is essential that the thermally imageable compositions show considerable stability to the thermal effects of the manufacturing process in order to have a useful shelf life.

Isbrandt et al, U.S. Pat. No. 4,423,139 discloses a stabilizing agent for preventing oxidation and premature reaction of leuco dyes. The stabilizing agent comprises a combination of (1) one or more aromatic compounds which form quinones, diimines or quinonimines upon oxidation, or combinations of these, in combination with (2) 1-phenyl-3-pyrazolidinone (commonly known as phenidone), or derivatives of 1-phenyl-3-pyrazolidinone, or combinations of these. Although this stabilizing combination is good for preventing premature reaction of leuco dyes under storage condtions, it is not particularly useful for preventing premature spotting during the process of manufacturing thermally imageable material.

SUMMARY OF THE INVENTION

This invention involves the prevention of spotting and backgrounding of transparency films bearing thermally imageable compositions that contain combinations of leuco dyes and nitrate salts. Spotting and backgrounding which often occur during the drying step of the manufacturing process can be prevented by the addition of one or more Bronsted-Lowry bases, i.e. proton acceptors, which have conjugate acids with pKa values of zero or higher and an oxidation potential such that it cannot be oxidized by silver ion ($Ag+$). These bases have conjugate acids with Ka values equal to or less than one. Effective additives include amines; amine oxides; amides; ureas; salts of phosphinic, phosphonic, and phosphoric acids; phosphines; salts of carboxylic acids; oxygen acids, e.g., alcohols and phenols; thioacids, e.g. mercaptans and thiophenols; salts or complexes of carbon acids; and inorganic bases. The bases are not oxidizable to quinones, diimines, or quinonimines. Addition of one or more of those bases to thermally imageable compositions results in decreases or elimination of spotting, thus allowing an increase in the drying temperature during the drying step of the manufacturing process, further resulting in faster drying, higher coating rates, decreased moisture sensitivity, and lower manufacturing costs.

Reduction and elimination of defects in the coated film resulting from premature dye color formation can also be brought about by adding the anti-spotting compounds of the present invention to the imaging compositions.

DETAILED DESCRIPTION

This invention involves compositions which are imageable by thermal energy, e.g. infrared radiation, and coated substrates prepared therefrom, which compositions comprise (1) at least one leuco dye, (2) at least one inorganic nitrate salt, (3) a polymeric binder, (4) an optional acid, and (5) at least one antispotting compound selected from the group consisting of (A) tertiary amines,
(B) secondary amines,
(C) primary amines,
(D) primary amides,
(E) secondary amides,
(F) tertiary amides,
(G) tertiary amine oxides,
(H) ureas,
(I) salts of carboxylic acids,
(J) salts of alcohols,
(K) salts of thiols,
(L) salts of complexes of carbon acids having pKa values between 0 and 25, inclusive,
(M) salts of organophosphoric acids,
(N) salts of organophosphonic acids,
(O) salts of organophosphinic acids,
(P) phosphines, and
(Q) inorganic salts.

These compounds can be represented by the following general formulas:

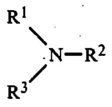

(A)

wherein $R^1$, $R^2$, and $R^3$ can be the same or different and represent a member of the group selected from substituted or unsubstituted alkyl groups having 1 to 20 carbon atoms, substituted or unsubstituted alkenyl groups having from 1 to 16 carbon atoms, substituted or unsubstituted aryl groups having up to 3 fused rings. The tertiary amine can have the following structure:

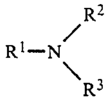
(A1)

wherein $R^1$ is as defined above and

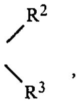
, represents, for example,

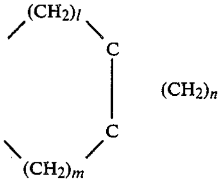

where l is an integer from 0 to 6, inclusive, m is an integer from 0 to 6, inclusive, and n is an integer from 0 to 6, inclusive;

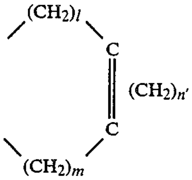

where l and m are as defined above and n' is 0 or 4;

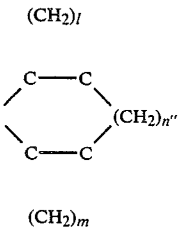

where l and m are as defined above, and n'' is an integer from 0 to 4, inclusive;

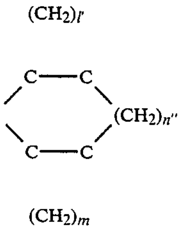

where l' is 0 or 4, m and n'' are as defined above. The tertiary amine can also have the following structure:

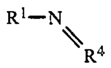
(A2)

wherein $R^1$ is as defined above, and $R^4$ represents $CR^5R^6$ where $R^5$ and $R^6$ represents a member of the class from which $R^1$, $R^2$, and $R^3$ are selected, with the proviso that $R^5$ and $R^6$ need not be the same as $R^1$, $R^2$, or $R^3$.

The tertiary amine can further have the following structure:

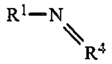
(A3)

wherein

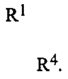

represents, for example,

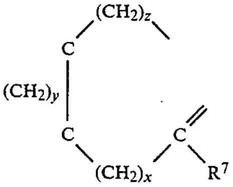

where x is 0, 1, or 2, y is an integer from 0 to 8, inclusive, and z is 0, 1, or 2, and $R^7$ represents a member of the class from which $R^1$, $R^2$, and $R^3$ are selected, with the proviso that $R^7$ need not be the same as $R^1$, $R^2$, $R^3$;

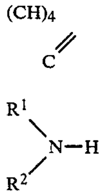
(B)

wherein $R^1$ and $R^2$ are as defined above.

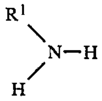
(C)

wherein $R^1$ and $R^2$ are as defined above.

None of the amines listed above are oxidizable to quinones, diimines, or quinoneimines.

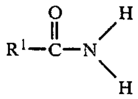
(D)

wherein $R^1$ is as defined above.

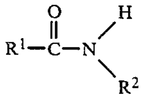
(E)

wherein $R^1$ and $R^2$ are as defined above.

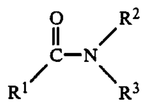

(F)

wherein $R^1$, $R^2$, and $R^3$ are as defined above.

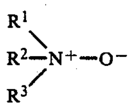

(G)

wherein $R^1$, $R^2$ and $R^3$ are as defined above.

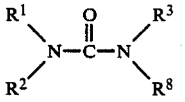

(H)

wherein $R^1$, $R^2$, and $R^3$ are as defined above, and $R^8$ represents a member of the class from which $R^1$, $R^2$, and $R^3$ are selected, with the proviso that $R^8$ need not be the same as $R^1$, $R^2$, or $R^3$.

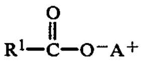

(I)

wherein $R^1$ is as defined above, and $A^+$ represents a metallic cation, e.g. $Li^+$, $Na^+$, $K^+$, $Mg^{+2}$, $Ca^{+2}$, $Mn^{+2}$, $Fe^{+3}$, $Ni^{+2}$, $Cu^{+2}$, $Zn^{+2}$ . . .

$R^1O^-A^+$ (J)

wherein $R^1$ and $A^+$ are as defined above.

$R^1S^-A^+$ (K)

wherein $R^1$ and $A^+$ are as defined above.

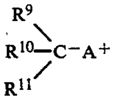

(L)

wherein $R^9$, $R^{10}$, and $R^{11}$ can be the same or different and represent a member of the group selected from H, $—NO_2$, —CN, $—COR^{12}$, $—COOR^{12}$, and $—SO_2R^{12}$ where $R^{12}$ is selected from the group consisting of phenyl group, naphthyl group, alkyl group having 1 to 4 carbon atoms, and $A^+$ is as defined above.

The salts or complexes of carbon acids can also include the following structures

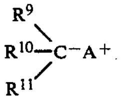

wherein $R^9$ and $A^+$ are as defined above and

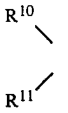

represent, for example,

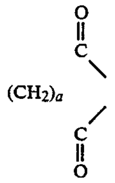

wherein a is 2, 3, or 4;

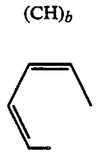

where b is 0 or 4.

The salts or complexes of carbon acids can further include the following structure $R^{13}—C≡C^-A^+$ wherein $A^+$ is as defined above, and $R^{13}$ represents the phenyl or naphthyl group.

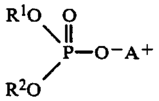

(M)

wherein $R^1$, $R^2$, and $A^+$ are as defined above.

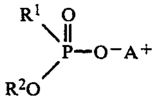

(N)

wherein $R^1$, $R^2$, and $A^+$ are as defined above.

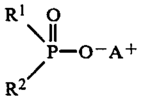

(O)

wherein $R^1$, $R^2$, and $A^+$ are as defined above.

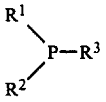

(P)

wherein $R^1$, $R^2$, and $R^3$ are as defined above.

$A^+Y^-$ (Q)

wherein $A^+$ is as defined above, and $Y^-$ represents a member of the group selected from —OH, S, HS, $CO_3$, $HCO_3$.

When $R^1$, $R^2$, or $R^3$ is a substituted alkyl or aryl group, the substituents can be any which do not deleteriously affect the function of the thermographic system. Suitable substituents include halo groups, e.g. chloro, bromo, iodo, fluoro; hydroxyl group; cyano group; nitro group; alkoxy group having, for example, 1 to 20 carbon atoms; alkyl carbonyl group having, for example, 1 to 20 carbon atoms; alkylsulfonyl group, having, for example, 1 to 20 carbon atoms. In addition when $R^1$, $R^2$, or $R^3$ is a substituted aryl group, the substituent can be alkylthio, having, for example, from 1 to 20 carbon atoms. $R^1$, $R^2$, $R^3$ can be mono-, di-, tri-, or tetra- substituted.

The aromatic compounds which form quinones, diimines, or quinonimines that are described in U.S. Pat. No. 4,423,139 are well-known developers for silver halide, e.g., AgCl, AgBr. In the process of developing silver halide, $Ag+$ ion oxidizes the developer to form a quinone, diimine, or quinonimine; at the same time, the $Ag+$ ion is reduced to silver metal, i.e., $Ag°$. The aromatic compounds that are capable of developing silver halide are, of course, oxidizable by $Ag+$ ion. Because of their oxidation potential, they are quite useful as antioxidants, as they react with oxidizing agents more rapidly than do leuco dyes. The bases that are useful in the compositions of the present invention are incapable of being oxidized by $Ag+$ ion; consequently they typically operate by suppressing the effects of the $H+$ ion during the process of manufacturing thermally imageable film or like material.

Dye classes which can be stabilized by the bases include styryl, phenoxazine, phenothiazine, and phenazine. Representative examples of styryl dyes are (a) 2,3-dihydro-1,3,3-trimethyl-2-[2-(2,4,6-trimethoxyphenyl)ethenyl]-1H-Indole; (b) 2-bromo-4-[2-(5-chloro-2,3-dihydro-1,3,3-trimethyl-1H-indol-2-yl)ethenyl]-N,N-dimethylbenzenamine; (c) 2,3-dihydro-1,3,3-trimethyl-2-[2-(4-dimethylamino)-phenyl-ethenyl]-1H-Indole; (d) 2,3-dihydro-1,3,3-trimethyl-2-[2-(4-N-morpholino-)phenyl-ethenyl]-1H-Indole; (e) 2,3-dihydro-1,3,3-trimethyl-2-[2-(4-N,N-bis-(2-cyanoethylamino)-phenyl-ethenyl]-1H-Indole.

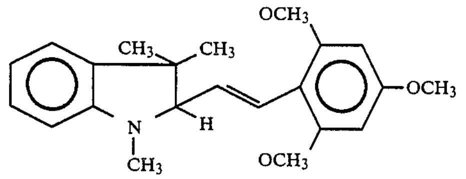
(a)

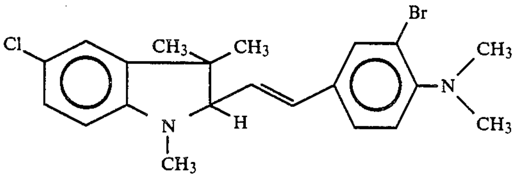
(b)

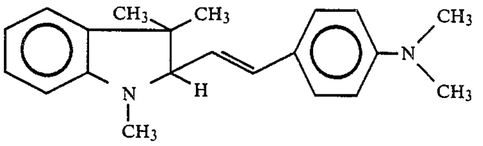
(c)

-continued

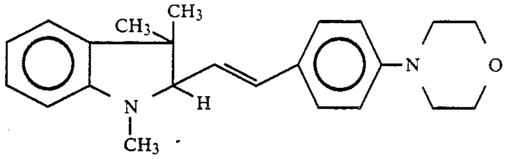
(d)

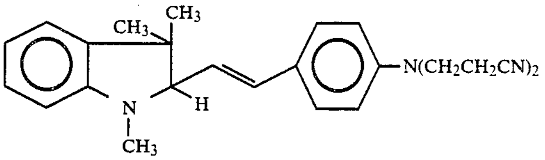
(e)

Representative examples of phenoxazine and phenothiazine dyes are: (f) 3,7-bis-(N,N-diethylamino)-10-benzoyl-phenoxazine and (g) 3,7-bis-(N,N-dimethylamino)-10-benzoyl-phenothiazine, respectively.

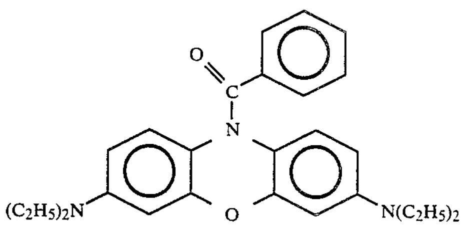
(f)

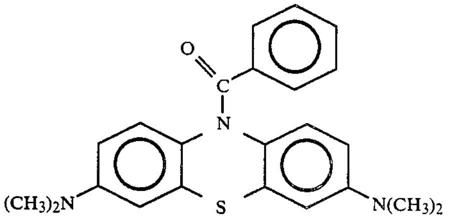
(g)

Representative examples of phenazine dyes are: (h) 5,10-dihydro-5-phenyl-10-benzoyl-3,7-bis-(N,N-diethylamino)phenazine and (i) 5,10-dihydro-5-ethyl-10-benzoyl-3,7-bis-(N,N-dimethylamino)phenazine.

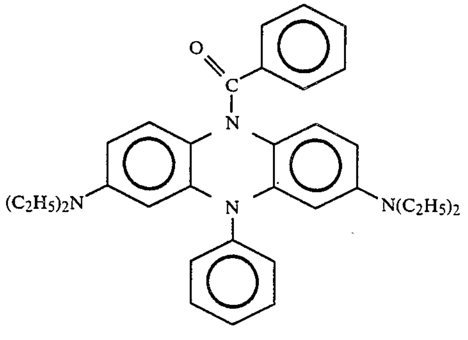
(h)

-continued (i)

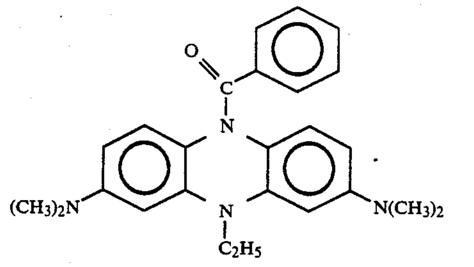

Nitrate salts suitable for this invention are themselves well known. They may be supplied as various chemical compounds, but are desirably provided as a metal salt, and most preferably provided as a hydrated metal salt. Most means of supplying the nitrate salt into the imaging composition are satisfactory. For example, organic salts, metal salts, acid salts, mixtures of acids and salts, and other means of supplying the ion are useful. Nitrates of zinc, cadmium, potassium, calcium, zirconyl ($ZrO_2$), nickel, aluminum, chromium, iron, copper, tin, magnesium, lead, and cobalt, ammonium nitrate, and cerous ammonium nitrate can be used.

The nitrate salt component of the present invention must be present in a form within the imaging composition so that oxidant (i.e., decomposition products of the nitrate) will be provided within the composition when it is heated to a temperature no greater than 200° F. (93° C.) for 60 seconds and preferably no greater than 160° F. (71° C.) for 60 or most preferably 30 seconds. The salt must be chosen so that the cation thereof is non-reactive with the leuco dye. In the practice of the present invention, non-reactive salts are defined as those salts the cations of which do not spontaneously oxidize the dyes that they are associated with at room temperature.

Preferred salts are the hydrated metal salts such as nickel nitrate hexahydrate, magnesium nitrate hexahydrate, aluminum nitrate nonahydrate, ferric nitrate nonahydrate, cupric nitrate trihydrate, zinc nitrate hexahydrate, cadmium nitrate tetrahydrate, bismuth nitrate pentahydrate, thorium nitrate tetrahydrate, cobalt nitrate hexahydrate, gadolinium or lanthanum nitrate nonahydrate, and mixtures of these hydrated nitrates. Nonhydrated or organic nitrates may be admixed therewith.

It is preferred to have at least 0.10 mole of nitrate ion per mole of dye. It is more preferred to have at least 0.30 or 0.50 mole of nitrate ion per mole of dye.

The bases described in this invention can be used at as low a concentration as 0.05 equivalent of base per equivalent of nitrate ion, or as high as 1.0 equivalent of base per equivalent of nitrate ion. The preferred range is from about 0.3 to about 0.6 equivalent of base per equivalent of nitrate ion.

The thermally stimulated oxidation of the leuco dye by the nitrate salt can be facilitated by the presence of an acid. The acids optionally useful in the thermographic system of this invention are acids as generally known to the skilled chemist. Organic acids, preferably those having carboxylic groups, such as phthalic acid, are preferred, but inorganic acids can also be used. The acid can be present in a ratio of from 0 to 10 times the amount of the nitrate ion.

The leuco dye, nitrate salt, base having a $pKa \geqq 0$, and acid, when employed, are dissolved in a binder, which binder is neither strongly basic nor strongly acidic but which is sufficiently polar to hold the constituents in solution. It is preferred that the binder be selected from polymeric materials. Such resins as polyvinyl acetals, e.g., polyvinyl butyral, polyvinyl resins, polyvinylpyrrolidone, polyesters, polycarbonates, polyamides, polyacrylates, cellulose esters, copolymers and blends of these classes of resins, can be used. Saran, a vinyl chloride-vinylidene chloride copolymer, is particularly preferred. Natural polymeric materials such as gelatin and gum arabic can also be used.

The leuco dye should be present at a concentration of at least 0.3% by weight, based on the weight of the binder, preferably at a concentration of at least 1% by weight, based on the weight of the binder, and most preferably at a concentration of from 2 to 10% or more by weight, based on the weight of the binder.

A formulation which can be applied by conventional coating techniques can be produced by dissolving the leuco dye, the metal nitrate, and the polymeric binder, together with an organic acid, and, optionally, a conventional stabilizing compound, e.g. catechol, phenidone, along with the base whose conjugate acid has the required pKa in an inert organic solvent, such as, for example, acetone, methyl ethyl ketone, or tetrahydrofuran.

The formulation can be coated onto a support by methods well known in the art, such as, for example, wire-wound rod, knife, or extrusion coating. Typical wet thickness of the layer can range from about 10 to about 100 micrometers (μm), and the layer can be dried in forced air at temperatures ranging from 20° C. to 50° C. It is preferred that the coating thickness be selected to provide maximum image densities greater than 0.2, and more preferably in the range of 0.5 to 1.5, as measured on a MacBeth Color Densitometer Model TD 504 using the color filter complementary to the dye color.

The support material can be selected from a wide range of materials, including paper, glass, polymeric film, and the like, depending upon the particular imaging requirement. Preferred materials include polymeric films having good heat stability, such as polyesters. A particularly preferred polyester is polyethylene terephthalate.

The following examples, which are illustrative rather than limiting or delineative of the scope of the invention, serve to described the compositions and properties of the present invention.

EXAMPLES 1-15

These examples demonstrate the effect of adding amines which have conjugate acids with a $pKa > 0$ to the thermally imageable composition contemplated for this invention.

| Ingredient | Amount(g) |
|---|---|
| 3,7-bis-(N,N dimethylamino)10-benzoyl phenothiazine ("CopyKem II") | .12 |
| 2-(2H-benzotriazol-2-yl)-p-cresol ("Tinuvin P") | .113 |
| phthalic acid | .06 |
| 5% by weight phenidone solution in tetrahydrofuran (THF) | .14 |
| 5% by weight catechol solution in THF | .12 |
| tetrahydrofuran | 2.0 |
| ethanol | 1.0 |
| $Al(NO_3)_3.9H_2O$ | 0.12 |
| 15% by weight vinylidene chloride/ acrylonitrile copolymer (Saran ®F-310) | 8.66 |

-continued

| Ingredient | Amount(g) |
|---|---|
| in methyl ethyl ketone (MEK) | |

This formulation contains 0.32 millimole $Al(NO_3)_3 \cdot 9H_2O$ or 0.96 milliequivalents of nitrate ion. Stock solutions of additives were made containing 0.5 millimole/g of total solution and the amounts indicated in Table I were added to the samples. The resulting samples were coated on 4 mil transparent polyester film at a 3 mil wet thickness and dried at 162° F. for 3 minutes. The percentage of spotting resulting from the foregoing step was determined for each sample and is shown in Table I. The term "percentage of spotting" is defined here as the ratio of the area of coated film which is colored due to premature oxidation of the leuco dye, divided by the total area of coated film, multiplied by 100.

TABLE I

| Example | Sample | Additive[a] | pKa | Amount (Millimole) | Percentage of Spotting |
|---|---|---|---|---|---|
| 1 | 1 | N,N bis-(2-hydroxy- | 6 | .05 | 25 |
| | 2 | ethyl)-aniline | | .10 | 0 |
| | 3 | | | .30 | 0 |
| | 4 | | | .50 | 0 |
| 2 | 5 | 3-quinuclidinol | >11 | .05 | 50 |
| | 6 | | | .10 | 2–3 |
| | 7 | | | .30 | 0 |
| | 8 | | | .50 | 0 |
| 3 | 9 | triethylamine | 11.01 | .05 | 25 |
| | 10 | | | .10 | 15 |
| | 11 | | | .30 | 0 |
| | 12 | | | .50 | 0 |
| 4 | 13 | N,N-diethyl-aniline | 6.61 | .05 | 95 |
| | 14 | | | .10 | 20 |
| | 15 | | | .30 | 0 |
| | 15 | | | .50 | 0 |
| 5 | 17 | aniline | 4.63 | .05 | 20 |
| | 18 | | | .10 | 0 |
| | 19 | | | .30 | 0 |
| | 20 | | | .50 | 0 |
| 6 | 21 | N-methyl-aniline | 4.85 | .05 | 10 |
| | 22 | | | .10 | 1 |
| | 23 | | | .30 | 0 |
| | 24 | | | .50 | 0 |
| 7 | 25 | diethylamine | 10.49 | .05 | 15 |
| | 26 | | | .10 | 5 |
| | 27 | | | .30 | 0 |
| | 28 | | | .50 | 0 |
| 8 | 29 | pyridazine | 2.24 | .05 | 100 |
| | 30 | | | .10 | 100 |
| | 31 | | | .30 | 1–2 |
| | 32 | | | .50 | 0 |
| 9 | 33 | 2-methyl-pyrazine | 1.45 | .05 | 100 |
| | 34 | | | .10 | 95 |
| | 35 | | | .30 | 25 |
| | 36 | | | .50 | 5 |
| 10 | 37 | pyridine | 5.25 | .05 | 40 |
| | 38 | | | .10 | 25 |
| | 39 | | | .30 | 0 |
| | 40 | | | .50 | 0 |
| 11 | 41 | 1,3-diphenyl- | 10.12 | .05 | 70 |
| | 42 | guanidine | | .10 | 15 |
| | 43 | | | .30 | 0 |
| | 44 | | | .50 | 0 |
| 12 | 45 | bis(2,2,6,6-tetra- | 11 | .05 | 100 |
| | 46 | methyl-4-piperidinyl) | | .10 | 100 |
| | 47 | decanedioate | | .30 | 1 |
| | 48 | | | .50 | 0 |
| 13 | 49 | guinazoline | 3.43 | .05 | 100 |
| | 50 | | | .10 | 100 |
| | 51 | | | .30 | 1 |
| | 52 | | | .50 | 0 |
| 14 | 53 | thiazole | 2.44 | .05 | 100 |
| | 54 | | | .10 | 100 |
| | 55 | | | .30 | 95 |
| | 56 | | | .50 | 15 |
| 15 | 57 | pyridine N-oxide | 0.79 | .05 | 100 |
| | 58 | | | .10 | 100 |
| | 59 | | | .30 | 80 |
| | 60 | | | .50 | 10 |
| 16 | 61 | quinaldine | 5.83 | .05 | 80 |
| | 62 | | | .10 | 20 |
| | 63 | | | .30 | 0 |
| | 64 | | | .50 | 0 |
| | 65 | no additive | | | 100 |
| | 66 | | | | 100 |
| | 67 | | | | 100 |
| | 68 | | | | 100 |

[a]In Examples 1, 3–16 the additive was dissolved in tetrahydrofuran prior to its being added to the imageable composition. In Example 2, the additive was dissolved in methanol prior to its being added to the imageable composition.

As the pKa of the base's conjugate acid approaches zero, the additive is less effective as an antispotting agent.

EXAMPLES 17–20

These examples demonstrate the effect of adding amides and ureas which have conjugate acids with pKa values between about 0 and 2 to the thermally imageable composition contemplated for this invention. Samples were prepared as described in Examples 1–16. Again stock solutions of additives were made containing 0.5 millimole/g of total solution and the amounts indicated in Table II were added to the samples. All samples were coated and dried identically to those described in Examples 1–16. The percentage of spotting was determined for each sample, and is listed in Table II:

TABLE II

| Example | Sample | Additive[a] | pKa | Amount (Millimole) | Percentage of Spotting |
|---|---|---|---|---|---|
| 17 | 69 | acetamide | 0.63 | .05 | 95 |
| | 70 | | | .10 | 75 |
| | 71 | | | .30 | 20 |
| | 72 | | | .50 | 2 |
| 18 | 73 | dimethylacetamide | 0.96 | .05 | 100 |
| | 74 | | | .10 | 100 |
| | 75 | | | .30 | 90 |
| | 76 | | | .50 | 20 |
| 19 | 77 | urea | 0.10 | .05 | 100 |
| | 78 | | | .10 | 80 |
| | 79 | | | .30 | 10 |
| | 80 | | | .50 | 0 |
| 20 | 81 | 1,1,3,3-tetramethyl- | 1 | .05 | 100 |
| | 82 | urea | | .10 | 100 |
| | 83 | | | .30 | 95 |
| | 84 | | | .50 | 50 |

[a]In Examples 17, 18 and 20, the additive was dissolved in tetrahydrofuran prior to its being added to the imageable composition. In Example 19 the additive was dissolved in methanol prior to its being added to the imageable composition.

EXAMPLES 21–24

These examples demonstrate the effect of adding salts of carboxylic acids which have conjugate acids with pKa>0 to the thermally imageable composition contemplated for this invention. A procedure identical to that described in Examples 1–16 was used and the results are listed in Table III:

TABLE III

| Example | Sample | Additive[a] | pKa | Amount (Millimole) | Percentage of Spotting |
|---|---|---|---|---|---|
| 21 | 89 | lithium phthalate | 5.51 | .05 | 100 |
| | 90 | | | .10 | 60 |
| | 91 | | | .30 | 1 |
| | 92 | | | .50 | 0 |
| 22 | 93 | lithium salicylate | 2.97 | .05 | 100 |
| | 94 | | | .10 | 100 |
| | 95 | | | .30 | 1 |
| | 96 | | | .50 | 0 |
| 23 | 97 | lithium n-heptanoate | 4.89 | .05 | 90 |
| | 98 | | | .10 | 75 |
| | 99 | | | .30 | 0 |
| | 100 | | | .50 | 0 |
| 24 | 101 | manganese acetate | 4.75 | .05 | 100 |
| | 102 | | | .10 | 40 |
| | 103 | | | .30 | 0 |
| | 104 | | | .50 | 0 |

[a]In Examples 21-24, each additive was dissolved in methanol prior to its being added to the imageable composition.

EXAMPLES 25-27

These examples demonstrate the effect of adding salts of alcohols or thiols which have conjugate acids with pKa>5 to the thermally imageable composition contemplated for this invention. A procedure identical to that described in Examples 1-16 was used and the results are shown in Table IV:

TABLE IV

| Example | Sample | Additive[a] | pKa | Amount (Millimole) | Percentage of Spotting |
|---|---|---|---|---|---|
| 25 | 109 | sodium methylate | 16 | .05 | 100 |
| | 110 | | | .10 | 100 |
| | 111 | | | .30 | 15 |
| | 112 | | | .50 | 0 |
| 26 | 113 | lithium phenolate | 9.95 | .05 | 100 |
| | 114 | | | .10 | 100 |
| | 115 | | | .30 | 0 |
| | 116 | | | .50 | 0 |
| 27 | 117 | lithium | 8 | .05 | 100 |
| | 118 | thiocresolate | | .10 | 70 |
| | 119 | | | .30 | <1 |
| | 120 | | | .50 | 0 |

[a]In Example 25, the additive was partially dissolved in methanol and was added to the imageable composition as a homogeneous suspension at a concentration of 0.25 millimole/g total solution. In Example 26, the additive was dissolved in methanol prior to its being added to the imageable composition. In Example 27, the additive was dissolved in tetrahydrofuran prior to its being added to the imageable composition.

EXAMPLE 28

This example demonstrates the effect of adding a salt of a carbon acid which has a conjugate acid with pKa>4 to the thermally imageable composition contemplated for this invention. A procedure identical to that described in Examples 1-16 was used and the results are shown in Table V:

TABLE V

| Example | Sample | Additive[a] | pKa | Amount (Millimole) | Percentage of Spotting |
|---|---|---|---|---|---|
| 28 | 125 | nickel 2,5-pentane- | 9 | .05 | 100 |
| | 126 | dionate | | .10 | 95 |
| | 127 | | | .30 | 2 |
| | 128 | | | .50 | 0 |

[a]The additive was dissolved in tetrahydrofuran and added to the imageable composition at a concentration of 0.125 millimole/g total solution.

EXAMPLES 29-33

These examples demonstrate the effect of adding salts of organophosphoric acids, of organophosphonic acids, or of organophosphinic acids, or phosphines which have pKa>0 to the thermally imageable composition contemplated for this invention. A procedure identical to that described in Examples 1-16 was used and the results are shown in Table VI:

TABLE VI

| Example | Sample | Additive[a] | pKa | Amount (Millimole) | Percentage of Spotting |
|---|---|---|---|---|---|
| 29 | 133 | lithium di-(2-ethyl- | 1-2 | .05 | 100 |
| | 134 | hexyl)phosphate | | .10 | 70 |
| | 135 | | | .30 | 0 |
| | 136 | | | .50 | 0 |
| 30 | 137 | nickel di-(2-ethyl- | 1-2 | .05 | 100 |
| | 138 | hexyl)phosphate | | .10 | 100 |
| | 139 | | | .30 | 10 |
| | 140 | | | .50 | 0 |
| 31 | 141 | phosphonic acid, | 1.5-2.5 | .05 | 100 |
| | 142 | [[3,5-bis(1,1-di- | | .10 | 100 |
| | 143 | methyl-ethyl)-4- | | .30 | 0 |
| | 144 | hydroxyphenyl] methyl]monoethyl ester, nickel (+2) salt | | .50 | 0 |
| 32 | 145 | lithium di-n- | 2.5-3.5 | .05 | 100 |
| | 146 | decyl-phosphinate | | .10 | 90 |
| | 147 | | | .30 | 1 |
| | 148 | | | .50 | 0 |
| 33 | 149 | diphenyl-phosphine | 0.03 | .05 | 90 |
| | 150 | | | .10 | 15 |
| | 151 | | | .30 | 0 |
| | 152 | | | .50 | 0 |

[a]The additives in Examples 29 and 32 were dissolved in a mixture containing 85% ethanol and 15% water and added to the imageable composition at a concentration of 0.25 millimole/g total solution. In Examples 30, 31 and 33, the additive was dissolved in tetrahydrofuran prior to its being added to the imageable composition.

EXAMPLES 34-35

These examples demonstrate the effect of adding inorganic bases which have conjugate acids with pKa>0 to the thermally imageable composition contemplated for this invention. A procedure identical to that described in Examples 1-16 was used and the results are shown in Table VII.

TABLE VII

| Example | Sample | Additive[a] | pka | Amount (Millimole) | Percentage of Spotting |
|---|---|---|---|---|---|
| 34 | 153 | potassium hydroxide | 16 | .05 | 100 |
| | 154 | | | .10 | 100 |
| | 155 | | | .30 | 5 |
| | 156 | | | .50 | 0 |
| 35 | 157 | sodium sulfide | 7 | .05 | 100 |
| | 158 | | | .10 | 100 |
| | 159 | | | .30 | 0 |
| | 160 | | | .50 | 0 |

[a]In Example 34, the additive was dissolved in methanol prior to its being added to the imageable composition. In Example 35, the additive was partially dissolved in methanol and added to the imageable composition as a homogeneous suspension at a concentration of 0.25 millimole/g total solution.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A thermally imageable composition comprising at least one leuco dye in reactive proximity to an inorganic nitrate salt, whereby imagewise application of heat causes said nitrate salt to oxidize said at least one leuco dye to produce a change in color, and an effective amount of at least one base characterized as having a conjugate acid having a pKa greater than or equal to zero and an oxidation potential such that it cannot be oxidized by silver.

2. The composition of claim 1 wherein said at least one base is not oxidizable to a quinone, diimine, or quinoneimine.

3. The composition of claim 1 wherein said at least one base is selected from the group consisting of (A) tertiary amines,
(B) secondary amines,
(C) primary amines,
(D) primary amides,
(E) secondary amides,
(F) tertiary amides,
(G) tertiary amine oxides,
(H) ureas,
(I) salts of carboxylic acids,
(J) salts of alcohols,
(K) salts of thiols,
(L) salts of complexes of carbon acids having pKa values between 0 and 25, inclusive,
(M) salts of organophosphoric acids,
(N) salts of organophosphonic acids,
(O) salts of organophosphinic acids,
(P) phosphines, and
(Q) inorganic salts.

4. The composition of claim 1 wherein said at least one base is present at a concentration of from about 0.05 to about 1.0 equivalent per equivalent of nitrate ion present in said composition.

5. The composition of claim 1 wherein said at least one leuco dye is selected from the group consisting of styryl, phenoxazine, phenothiazine, and phenazine.

6. The composition of claim 1 further including a binder.

7. The composition of claim 6 wherein said at least one leuco dye is present at a concentration of at least 0.3% by weight, based on the weight of the binder.

8. The composition of claim 1 further including an organic acid.

9. The composition of claim 8 wherein the concentration of organic acid is present in a ratio of from 0 to 10 times the amount of nitrate ion present in said composition.

10. The composition of claim 1 wherein there is at least 0.10 mole of nitrate ion per mole of dye.

11. A thermally imageable article comprising a substrate bearing on at least one major surface thereof the composition of claim 1.

12. The article of claim 11 wherein said substrate is selected from the group consisting of paper, glass and polymeric film.

13. The article of claim 12 wherein said substrate is transparent polymeric film.

* * * * *